United States Patent
Matsuo

(10) Patent No.: US 11,966,648 B1
(45) Date of Patent: Apr. 23, 2024

(54) INDUSTRIAL PRINTING SYSTEM, PRINT SERVER, AND PROCESS MANAGEMENT METHOD FOR DISTRIBUTED PROCESSING BY GROUPING APPARATUS FOR PEER-TO-PEER PRODUCTION PRINTING

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/121,529

(22) Filed: Mar. 14, 2023

(51) Int. Cl.
*G06F 3/12* (2006.01)
*G06K 15/02* (2006.01)

(52) U.S. Cl.
CPC .......... *G06F 3/1267* (2013.01); *G06F 3/1205* (2013.01); *G06K 15/1867* (2013.01)

(58) Field of Classification Search
CPC ...... G06F 3/1226; G06F 3/1207; G06F 3/121; G06F 3/126; G06F 3/1285; G06F 3/1296; G06F 3/1203; G06F 3/1204; G06F 3/1267; G06F 3/1287; G06F 3/1288
See application file for complete search history.

(56) References Cited

U.S. PATENT DOCUMENTS

| | | | |
|---|---|---|---|
| 9,817,622 B2 * | 11/2017 | Kamath | G06F 3/1288 |
| 2010/0135687 A1 * | 6/2010 | Le | G03G 15/5083 399/82 |
| 2014/0325517 A1 * | 10/2014 | Takahashi | G06F 9/5077 718/102 |
| 2015/0156351 A1 | 6/2015 | Yamamoto | |
| 2020/0201585 A1 * | 6/2020 | Miyajima | G06F 3/1207 |

FOREIGN PATENT DOCUMENTS

JP 2015-107555 A 6/2015

* cited by examiner

*Primary Examiner* — John R Wallace
(74) *Attorney, Agent, or Firm* — Hawaii Patent Services; Nathaniel K. Fedde; Kenton N. Fedde

(57) ABSTRACT

Provided is an industrial printing system that efficiently performs peer-to-peer distributed processing of production printing by grouping. The storage unit stores capability information indicating capabilities of processability in rasterizing process, printing process, and post-processing process. The group setting unit sets a group that designates an apparatus capable of processing the job based on the capability information stored in the storage unit. The job collection unit collects the job corresponding to the group set by the group setting unit by determining from processing requirement of the job. The processing management unit transmits the job collected by the job collection unit to the apparatus designated in the group and requests processing thereof.

15 Claims, 8 Drawing Sheets

INDUSTRIAL PRINTING SYSTEM, PRINT SERVER, AND PROCESS MANAGEMENT METHOD FOR DISTRIBUTED PROCESSING BY GROUPING APPARATUS FOR PEER-TO-PEER PRODUCTION PRINTING

BACKGROUND

The present disclosure relates to an industrial printing systems, a print servers, and a process management method with distributed processing, particularly for industrial printing (production printing).

Among print systems that typically include a plurality of printers, there is a print system that performs so-called ubiquitous printing. In this system, when a print system including a plurality of printers (MFPs) receives a ubiquitous job from a PC that issued the job, the first MFP stores the print settings in memory if the print settings can be processed by its own print function, and if it cannot be processed, it is transferred to the next MFP. This processing is performed according to the predetermined order from the first MFP to the Nth MFP. This saves the ubiquitous job in the memory of the MFP that can process it. As a result, in this printing system, it is possible to reduce the waiting time until the user obtains the printed matter.

That is, in this typical technique, the print data (job) is transferred as it is to each MFP, and it is determined whether or not the transferred MFP itself can process the data.

On the other hand, in industrial printing called production printing, which uses a commercial (industrial) printing apparatus, the component members of the final product are produced by dividing into a plurality of processes. For example, in the case of bookbinding, a cover, body (color), body (black and white), a promotional item, a band, a shipping envelope, or the like, are processed as different jobs. Then, in the middle of the process, each job is combined and finished as a book as the final product.

These production printing systems provide "grouping" for efficiently processing a large number of print jobs by collectively managing a plurality of jobs that perform the same processes with a management server.

SUMMARY

An industrial printing system according to the present disclosure is an industrial printing system for production printing having a plurality of print servers that performs distributed processing of a job, each of the plurality of print servers including: a storage unit that stores capability information indicating capabilities of processability in rasterizing process, printing process, and post-processing process; a group setting unit that sets a group that designates an apparatus capable of processing the job based on the capability information stored in the storage unit; a job collection unit that collects the job corresponding to the group set by the group setting unit by determining from processing requirement of the job; and a processing management unit that transmits the job collected by the job collection unit to the apparatus designated in the group and requests processing thereof.

A print server according to the present disclosure is a print server that performs distributed processing of a job in an industrial printing system for production printing, including: a storage unit that stores capability information indicating capabilities of processability in rasterizing process, printing process, and post-processing process; a group setting unit that sets a group that designates an apparatus capable of processing the job based on the capability information stored in the storage unit; a job collection unit that collects the job corresponding to the group set by the group setting unit by determining from processing requirement of the job; and a processing management unit that transmits the job collected by the job collection unit to the apparatus designated in the group and requests processing thereof.

A process management method according to the present disclosure is a process management method performed by an industrial printing system for production printing, comprising a plurality of print servers for distributed processing of jobs, including the steps of: storing capability information indicating capability of processability in rasterizing process, printing process, and post-processing process; setting a group that designates an apparatus capable of processing the job based on the stored capability information; collecting the job corresponding to the set group by determining from the processing requirements of the jobs; and transmitting the collected jobs to the apparatus designated in the group to request processing thereof.

DETAILED DESCRIPTION

Embodiment

[Configuration of Industrial Printing System X]

Figure 1:
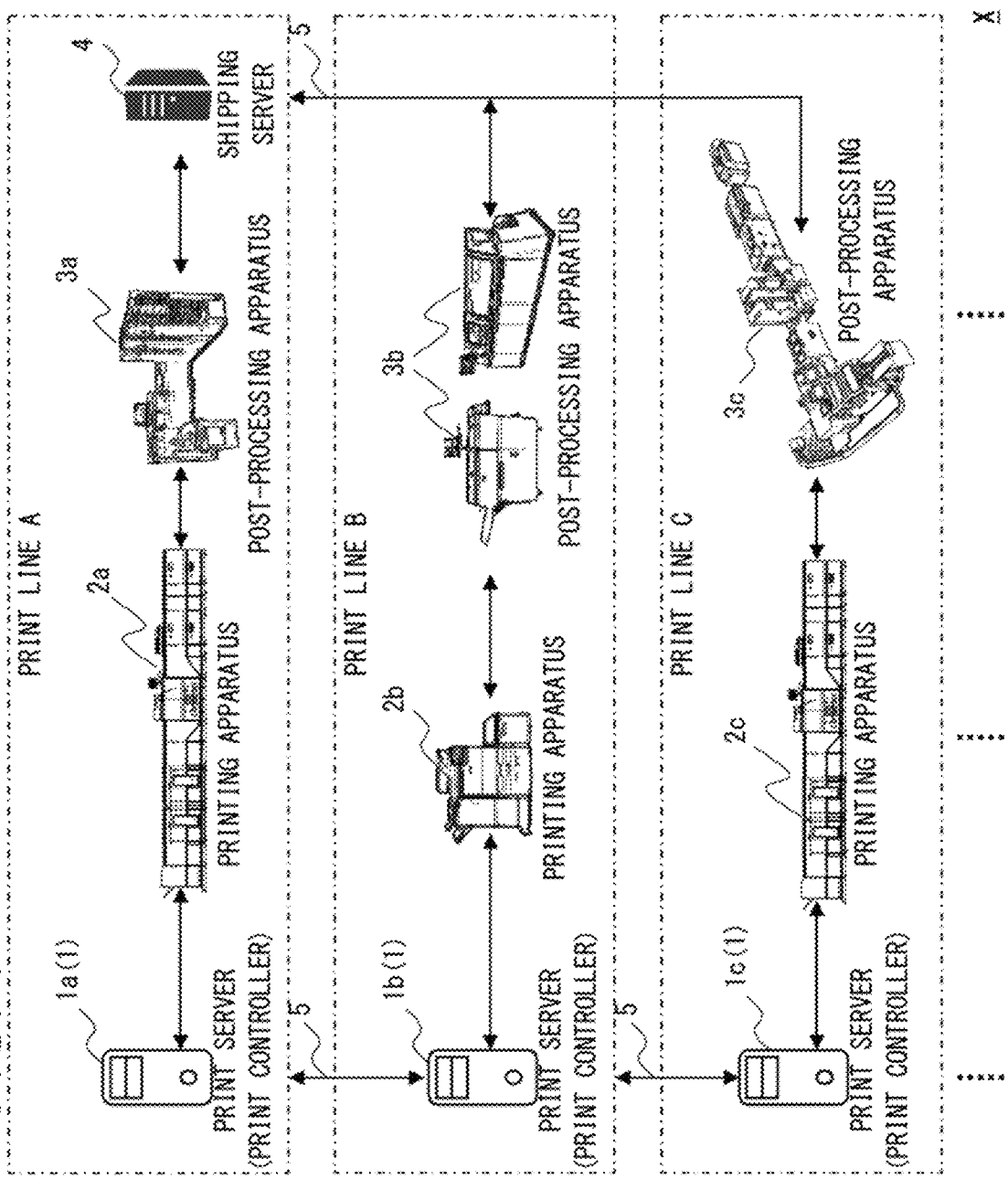
FIG. 1 is an example of a system configuration diagram of an industrial printing system according to an embodiment of the present disclosure.

Firstly, with reference to FIG. 1, an example of the overall system configuration of the industrial printing system X according to the present embodiment is described.

The industrial printing system X according to the present embodiment is a system that executes for generating print data, rasterizing, and outputting by a printing step and a post-processing step (hereinafter also simply referred to as "printing") in industrial printing (production printing).

Figure 3:
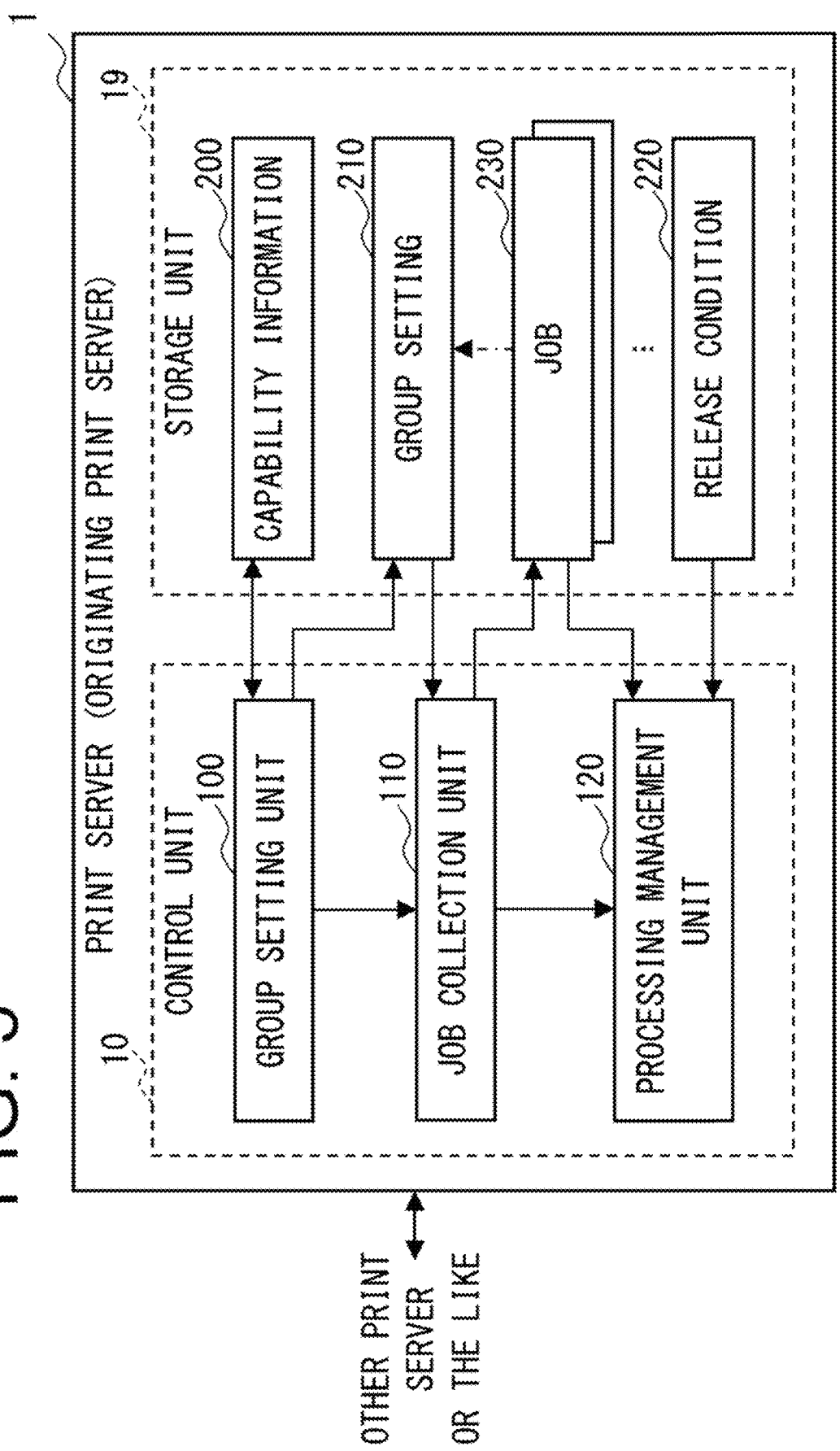
FIG. 3 is a block diagram showing the functional configuration of the print server as shown in FIG. 1.

Here, in the industrial printing system X according to the present embodiment, a final product such as a book to be output is defined as an "order", and each component of the order is defined as a job 230 (FIG. 3).

In the industrial printing system X, sites (printing lines) such as printing companies, printing factories, or the like, which provides a print server 1 and component apparatuses (group), are connected and linked by a network 5. The component apparatuses (group) are printing-related apparatuses that include a printing apparatus 2, a post-processing apparatus 3, a shipping server 4, or the like.

In FIG. 1, as an example of cooperation between sites, print servers 1a, 1b, 1c, . . . of printing lines A, B, C, . . . and a shipping server 4 of printing line A are connected via a network 5. Further, in this example, the printing lines A, B, C, . . . are connected to printing apparatuses 2a, 2b, 2c, . . . and post-processing apparatuses 3a, 3b, 3c, . . . .

Hereinafter, when referring to any one of these print servers 1a, 1b, 1c, . . . is simply called to print server 1. Similarly, when referring to any one of the printing apparatuses 2a, 2b, 2c, . . . is simply called to the printing apparatus 2. Similarly, when referring to any one of post-processing apparatuses 3a, 3b, 3c, . . . is simply called to post-processing apparatus 3.

The print server 1 is an information processing apparatus serving as a print controller that manages and controls component apparatuses provided at each site. The print server 1 is composed of a PC (Personal Computer) server, a dedicated apparatus, a general-purpose apparatus, or the like.

In the present embodiment, the print server 1 executes an application software (hereinafter simply referred to as "application") for dedicated print management (order output management). As a result, the print server 1 performs peer-to-peer distributed processing of the job 230 (FIG. 3) for production printing. This print management application (hereinafter referred to as a "dedicated application") may execute a common platform providing print design creation, user management, tenant management, security management, maintenance notification service, prepress processing management, storage management of each document, management of the printing apparatus 2, or the like.

Specifically, in production printing, the print server 1 transmits and receives various instructions and information to and from the printing apparatus 2, the post-processing apparatus 3, the shipping server 4, and the like. As a result, the print server 1 manages the status of each apparatus and requests the processing of the job 230.

In the present embodiment, the print server 1 performs scheduling at least part of the job 230 between the print server 1 to request processing side (originating print server) and the print server 1 to be requested processing side (other print server). Then, the originating print server or the other print server that executes the processing allocates the processing of the job 230 to each component apparatus in the site, and it causes the processing to be executed according to the schedule.

The printing apparatus 2 may be an industrial printer including an image forming apparatus, an automated offset printing apparatus, or the like. The printing apparatus 2 is capable of performing process of printing step such as small-lot printing, large-volume (multi-lot) offset printing, and the like.

The printing apparatus 2 at each site according to the present embodiment may differ in size, quality, color profile, recordable range, or the like, for the recording paper used in the printing step.

The post-processing apparatus 3 is a post-processing apparatus for executing post-processing processes such as folding, collating, bookbinding, cutting, bookbinding or the like, for recording paper printed by the printing apparatus 2.

The post-processing apparatus 3 at each site according to the present embodiment may also differ in the contents and range of processes that can be executed in the post-processing process.

The shipping server 4 is a server that manages the shipping of orders sent from each site after the printing step or post-processing step is completed.

In the present embodiment, an example of using the shipping server 4 at the site of company A is described. However, the shipping server 4 may be provided at other sites.

The network 5 is a LAN (Local Area Network), a wireless LAN (Wi-Fi), a WAN (Wide Area Network), a mobile telephone network, an industrial network, a voice telephone network, other dedicated line, or the like. The network 5 can transmit and receive various commands and data to and from each apparatus. Furthermore, between the print server 1 and each component apparatus may also be connected via a LAN, or the like, of the network 5. In addition, the network 5 may be configured with a VPN (Virtual Private Network), or the like.

In addition, a plurality of these apparatuses may exist according to the application, the scale of printing, and the like. Each apparatus can be connected to the print server 1 by various protocols via the network 5, or the like. Alternatively, the print server 1 and each apparatus may be directly connected by wire using various interfaces.

In addition, each site may have the other component apparatus managed by the print server 1. Such the other component apparatus includes, for example, a terminal for manuscript submission, a terminal for design proofreading, a prepress apparatus, or the like.

Further, an administrator terminal or a general terminal used by an administrator or a user may be connected via the network 5 from inside and outside each site. The general terminal may include a so-called console.

Thus, each print server 1 can be accessed by the administrator or the user by using a web browser, a terminal, a dedicated application, or the like, with the administrator terminal, the general terminal, or the like. As a result, it is possible to acquire the job 230, print design, submit manuscript, manage prepress processing, check the progress, request processing, and the like.

[Control Configuration of Print Server 1]

Figure 2:
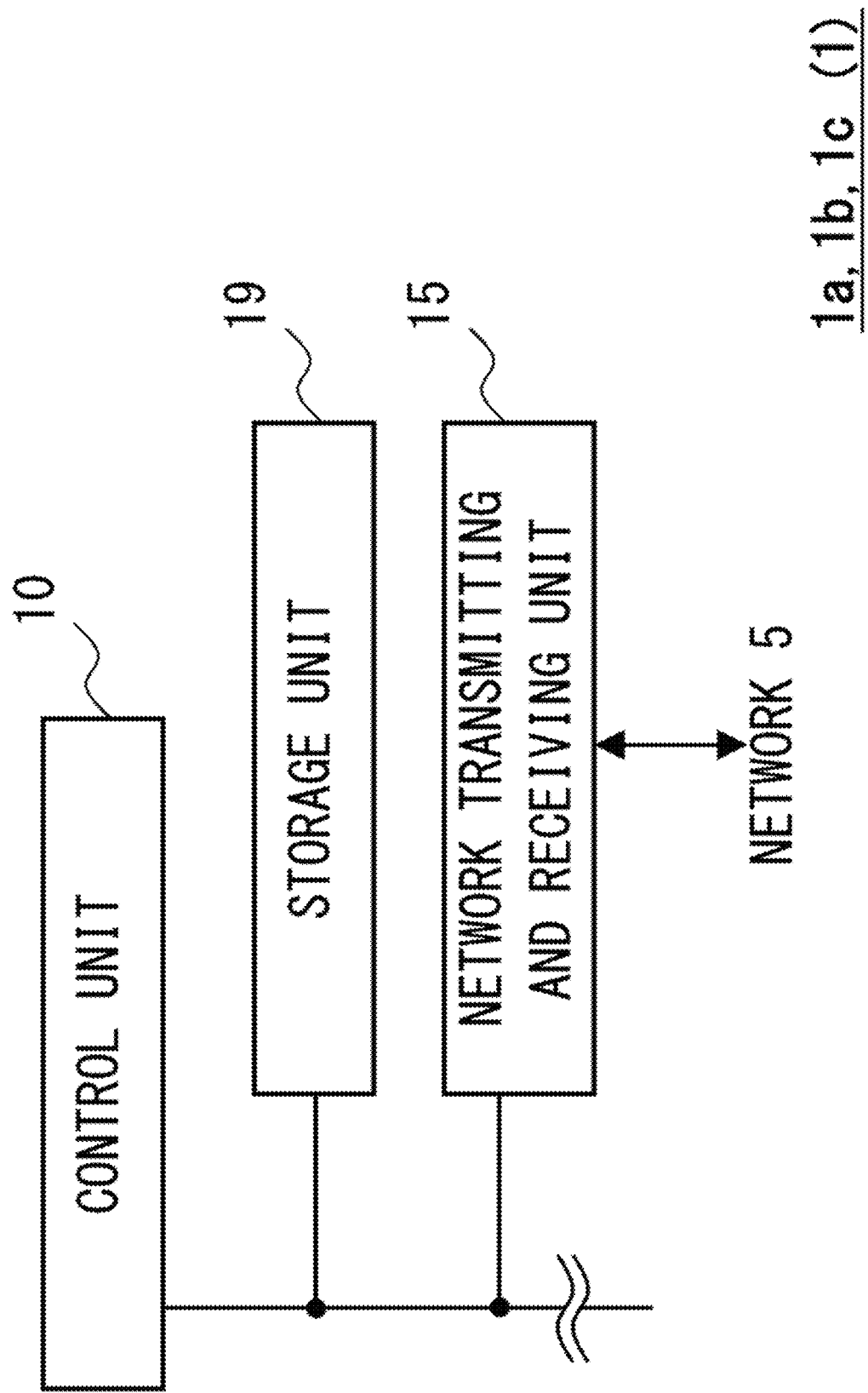
FIG. 2 is a block diagram showing the control configuration of the print server as shown in FIG. 1.

Next, as refer to FIG. 2, the control configuration of the print server 1 is described.

The print server 1 includes a control unit 10, a network transmitting and receiving unit 15, a storage unit 19, and the like. Each unit is connected to the control unit 10 and controlled in operation by the control unit 10.

The control unit 10 is the information processing unit such as GPP (General Purpose Processor), CPU (Central Processing Unit), MPU (Micro Processing Unit), DSP (Digital Signal Processor), GPU (Graphics Processing Unit), ASIC (Application Specific Integrated Circuit, an application-specific processor), or the like.

The control unit 10 reads the control program stored in the ROM or HDD of the storage unit 19, expands the control program in the RAM, and executes it, thereby operating as each unit of the function blocks as described later. Further, the control unit 10 controls the entire apparatus according to instruction information input from the administrator terminal or the general terminal.

The network transmitting and receiving unit 15 is a network connection unit including a LAN board, a wireless transmitting and receiving device, or the like, for connecting to the external network 5.

The network transmitting and receiving unit 15 transmits and receives data through a data communication line, and it transmits and receives voice signals through a via the voice telephone line.

The storage unit 19 is a non-transitory recording medium including semiconductor memory such as ROM (Read Only Memory) and RAM (Random Access Memory), magnetic storage such as HDD (Hard Disk Drive), and the like.

The control program for controlling the operation of the print server 1 is stored in the ROM or HDD of the storage unit 19. The control program includes an OS (Operating System), middleware on the OS, services (daemons), various applications, database data, and the like. Among these, the various applications include the dedicated application as described above.

In the present embodiment, the storage unit 19 stores programs and data for processing a raster image processor (hereinafter abbreviated as "rasterize" or "RIP") for converting vector image data (line drawing) into image data for printing (raster data). Programs and data for this rasterizing process also include commercial libraries, fonts, and the like. In addition, the storage unit 19 also stores information on component apparatuses connected to the same print line, control programs, and the like.

Furthermore, the storage unit 19 may also store account settings of the administrator and the user of the industrial printing system X, other data, and the like.

In addition, in the print server 1, the control unit 10 may be integrally formed, such as a CPU having built-in GPU, chip-on-module package, SOC (System On a Chip), or the like.

Also, the control unit 10 may have a built-in RAM, ROM, flash memory, or the like.

[Functional Configuration of Print Server 1]

Here, with reference to FIG. 3, the functional configuration of the print server 1 is described.

The control unit 10 of the print server 1 has a group setting unit 100, a job collection unit 110 and a processing management unit.

The storage unit 19 stores capability information 200, a group setting 210, a release condition 220, and a job 230.

The group setting unit 100 sets a group that designates an apparatus capable of processing the job 230 based on the capability information 200 stored in the storage unit 19 and stores the set group in the group setting 210 in the storage unit 19.

At this time, the group setting unit 100 can set a server group, a printing group, or a post-processing group in the group setting 210 as the group. Among them, the server group is a group having a print server 1 capable of rasterizing as the apparatus. The printing group is a group having a printing apparatuses 2 capable of printing process as the apparatus. The post-processing group is a group having a post-processing apparatuses 3 capable of post-processing process as the apparatus. Specifically, based on the type of the job 230, the group setting unit 100 can designate one of the plurality of the print servers 1 capable of processing the job 230 and one of the printing apparatus 2 and the post-processing apparatus 3 and set it in the group setting 210.

Here, in the present embodiment, the group setting unit 100 can set a multi-layer group in which the server group, printing group, and post-processing group are layered. The multi-layer group is described later.

Furthermore, the group setting unit 100 also sets a release condition 220, which is a condition for a processing request, for each group, and stores it in the storage unit 19.

The job collection unit 110 collects the job 230 corresponding to the group set by the group setting unit 100 based on the processing requirement of the job 230.

Specifically, the job collection unit 110 checks the capability required for processing the job (hereinafter referred to as "processing requirement") based on the capability information 200 in the job 230 acquired by the originating print server. Then, the job collection unit 110 classifies the job 230 into the group of the group setting 210 and associates it.

The processing management unit 120 sends the job 230 collected by the job collection unit 110 to the apparatus specified in the group setting 210 to request processing.

At this time, the processing management unit 120 requests the apparatus to process the job 230 according to the release condition 220. Specifically, the processing management unit 120 causes any one of the other print server, the printing apparatus 2, and the post-processing apparatus 3 specified for each group in the group setting 210 to process. More specifically, the processing management unit 120 transmits the job 230 to the other print server at the site where the specified apparatus is located and request processing.

Further, the processing management unit 120 may manage the processing of the job 230 by transmitting and receiving the job 230 itself, the data processed by the job 230, and processing status notification and completion notification between the print servers 1.

The capability information 200 is data that shares the capability information of each apparatus. Specifically, the capability information 200 is a table, or the like, indicating capability of processing ability (hereinafter referred to as "processing capability") for the capability of rasterizing process in each print server 1, the capability of the step of printing process in the printing apparatus 2 (printing step), and the capability of the step of post-processing process in the post-processing apparatus 3 (post-processing step). In the present embodiment, the capability information 200 is shared among the print servers 1. That is, each print server 1 stores the capability information 200, which corresponds to each site of the plurality of print servers 1 (group) capable to cooperate with each other, in the storage unit 19.

The details of the capability information 200 is described later.

The group setting 210 is a setting for grouping (to be grouped) the apparatus based on the shared capability information 200. The group setting 210 include setting(s) for the server group, the printing group, the post-processing group, and multi-layer group that layers these groups.

The details of the group setting 210 is also be described later.

The release condition 220 is a condition for requesting processing (hereinafter referred to as "release") of the group collected the job 230.

The details of the release conditions 220 is also be described later.

The job 230 is data in which various data used at the time of printing in production printing are put together.

The job 230 may be described, for example, in JDF (Job Description Format) and/or JMF (Job Messaging Format).

The details of the job 230 is described later.

(the Details of Capability Information 200)

Figure 4:
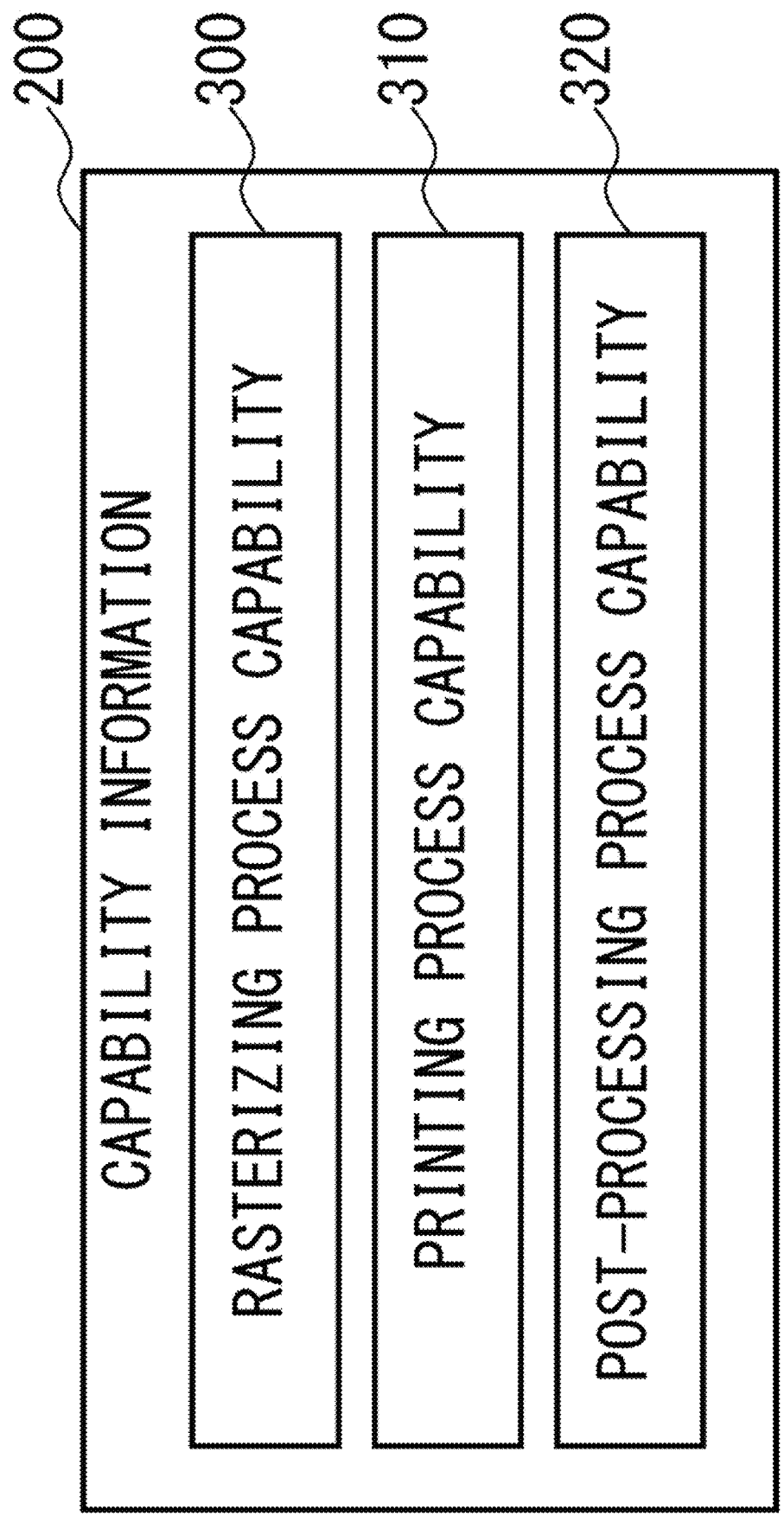
FIG. 4 is a block diagram showing details of the capability information as shown in FIG. 3.

Next, with reference to FIG. 4, the details of the capability information 200 is described.

In the present embodiment, the capability information 200 includes rasterizing process capability 300, printing process capability 310, and post-processing process capability 320.

The rasterizing process capability 300 is data indicating the processing capability when the print server 1 performs RIP. The rasterization capability 300 includes, for example, color profile information, spot color information, font information, image processing information, and plug-in information.

Among these, the color profile information is information on the color gamut (color profile). The color profile information includes data such as an ICC profile, and the like.

The spot color information is information for specifying special colors (spot colors) other than normal CMYK (Cyan, Magenta, Yellow, and Key plate). Specifically, the spot color information includes information on commercial libraries related to color designation. Commercial libraries include PANTONE® HKS, DIC®, TOYO®, and the like.

The font information is information such as usable commercial fonts, or the like.

The image processing information is information indicating available image processing and its capability. The image processing information includes, for example, presence or absence of image enhancement, skew correction, and the like.

The plug-in information is information related to plug-in processing. The plug-in information includes processing and capability information such as imposition, preflight, preflight profile, or the like, as this plug-in processing.

The printing process capability 310 is data indicating the processing capability when the printing apparatus 2 performs print processing. The printing process capabilities 310 include, for example, paper information, ink information, resolution information, printable paper information, and the like.

The paper information includes information such as paper type, tray information, size, orientation, and the like. Additionally, the paper information may include information such as inventory status of available paper, and the like.

The ink information is information such as color, monochrome, other supported color, spot color, other special color, and the like. The other special color includes special designations such as metallic colors, UV curable inks, and the like. In addition, the ink information may include remaining ink amount and spare ink information.

The resolution information is information indicating the resolution at the time of printing. For example, as resolution information, values such as 600 dpi (dot per inch), 1200 dpi, or the like, are set.

In addition, printing process capabilities 310 may include information such as halftone, trapping, scaling, presence or absence of borderless printing, inventory status of other resources required for printing, and the like.

The post-processing process capability 320 is data indicating the processing capability of the post-processing apparatus 3 when treatment process after printing (post-processing process) is performed. The post-processing capabilities 320 include, for example, cutting information, folding information, and bookbinding information.

The cutting information includes whether or not cutting is possible, the maximum thickness, and other information necessary for cutting.

The folding information includes information such as whether or not folding is possible, and the like.

The bookbinding information includes information such as whether bookbinding is possible and possible bookbinding types, or the like.

The post-processing process capability 320 may also include information about the processing capabilities of other types of post-processing apparatuses 3. For example, post-processing process capabilities 320 may include information such as whether streaking, perforation, binding, and punching are possible, or the like. In addition, information such as the stock status of post-processing process resources and the stock status of consumables may be included.

In addition to this, the capability information 200 may include alternative setting for alternative capability. In the alternative setting, for example, whether or not color profiles, spot colors, fonts, or the like, can be substituted or not is set. Further, the alternative setting may include a setting to what extent the alternative is allowed when the alternative is possible, or the like.

(the Details of Group Setting 210)

The group setting 210 includes group settings for the server group, the printing group, and the post-processing group. In the server group, the print server 1 capable of rasterizing is designated as the apparatus. In the printing group, the print apparatus 2 capable of print processing is designated as the apparatus. In the post-processing group, the post-processing apparatus 3 capable of post-processing process is designated as the apparatus.

In addition, the group setting 210 may be configured with multi-layer group. The multi-layer group is set as a layered group by associating the respective groups of the server group, printing group, and post-processing group.

Figure 5:
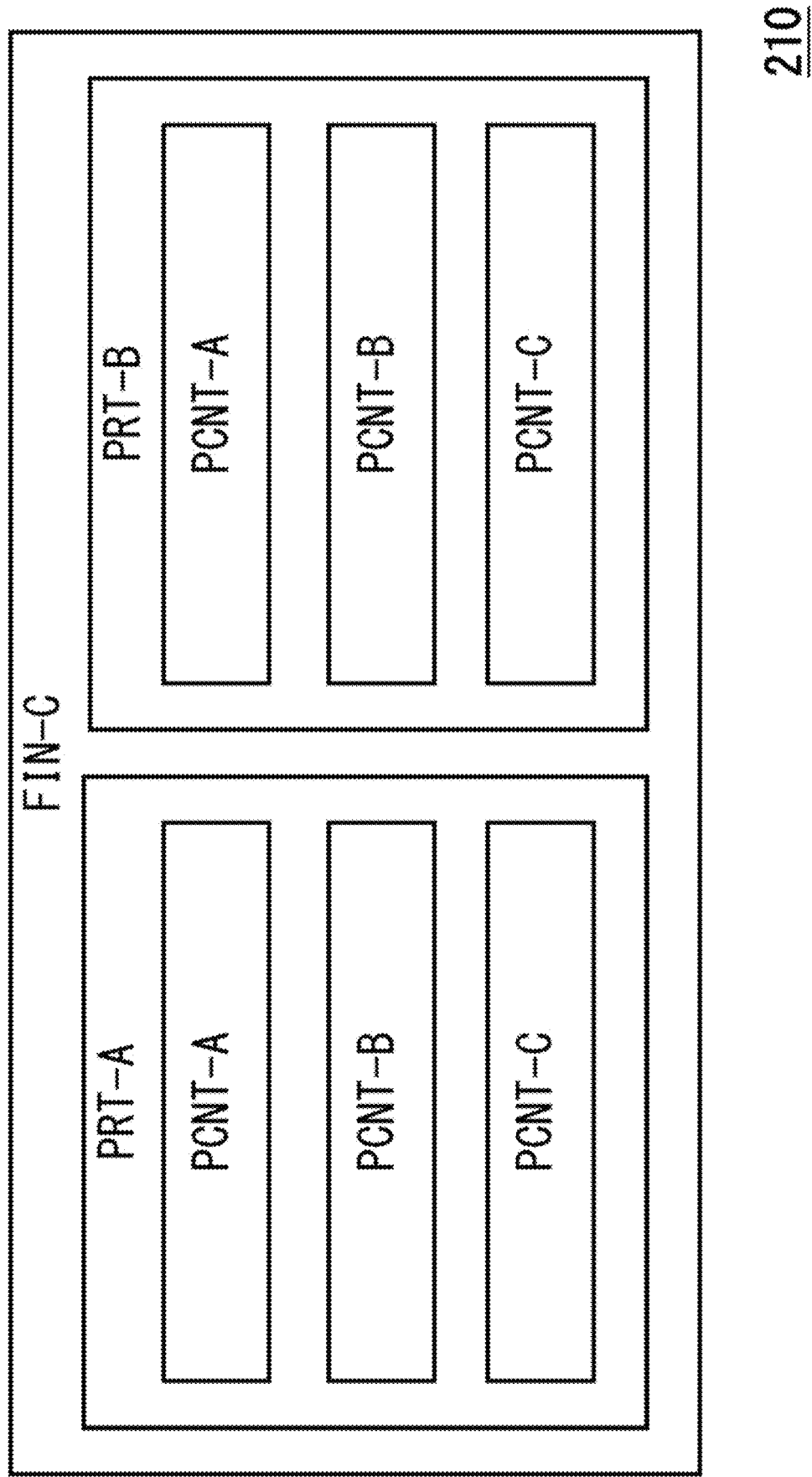
FIG. 5 is a block diagram showing details of the group settings as shown in FIG. 3.

Here, with reference to the example of FIG. 5, further details of the group settings 210 is described.

FIG. 5 shows an example of a multi-layer group of an online photobook as an order. In this example, the submitted data are various, and the specified spot colors are also various.

In addition, the paper to be printed differs depending on the price at the time of ordering, and finally finished processing such as "perfect binding" is performed, and the like.

To explain specifically, in this example, three server groups "PCNT-A", "PCNT-B" and "PCNT-C" are set. For example, the "PCNT-A" is designated as being processable by the print server 1a with the spot color as "PANTONE". "PCNT-B" is designated as being processable by the print server 1b with the spot color as "HKS". "PCNT-C" is designated as being processable by the print server 1c with the spot color as "DIC".

Furthermore, in this example, three printing groups "PRT-A", "PRT-B" and "PRT-C" are set. For example, "PRT-A" uses "SRA3" and "coated paper" as the recording paper and is designated as capable to be processed by the printer 2a. "PRT-B" uses "SRA3" and "plain paper" as the recording paper and is designated as capable to be processed by the printer 2b. "PRT-C" uses "A4" and "coated paper" as the recording paper and is designated as capable to be processed by the printer 2c.

Furthermore, in this example, three printing groups "FIN-A", "FIN-B", and "FIN-C" are set. For example, "FIN-A" is set as "flat-stitched" for bookbinding and is designated as capable to be processed by the post-processing apparatus 3a. "FIN-B" is set as "saddle-stitched" for bookbinding and is designated as capable to be processed by the post-processing apparatus 3b. "FIN-C" is set as "perfect binding" for bookbinding and is designated as capable to be processed by the post-processing apparatus 3c.

Further, in this example, as a multi-layer group, for example, the post-processing group "FIN-C" includes the printing groups "PRT-A" and "PRT-B."

Under this, "PRT-A" includes server groups of "PCNT-A", "PCNT-B" and "PCNT-C", and "PRT-B" also includes server groups of "PCNT-A", "PCNT-B" and "PCNT-C". The groups included as these server groups are examples in which the printing apparatuses 2 that print are different even if the same rasterizing process is performed.

In addition, the multi-layer groups may be regrouped and set after the processing is completed, as is described later.

(The Details of Release Condition 220)

The release condition 220, can set a release condition for each group. The condition may be, for example, a "threshold for the number of jobs 230", a "timer", a "schedule", or the like.

Among these, the "threshold for the number of jobs 230" is a condition for requesting processing when the number of jobs 230 (job count) equal to or greater than the number set as a threshold is collected in the group.

The "timer" is a condition of an elapsed time, such as requesting processing after a certain period of time has passed since the first job 230 collected the group.

The "schedule" is a condition for designating a time and requesting processing at that time.

These conditions can be freely combined by using "and", "or", or the like, and more detailed conditions can be set by using a macro language, or the like. In addition, each condition can also be set for the entire multi-layer group, included groups, and the like.

(The Details of Job 230)

Figure 6:
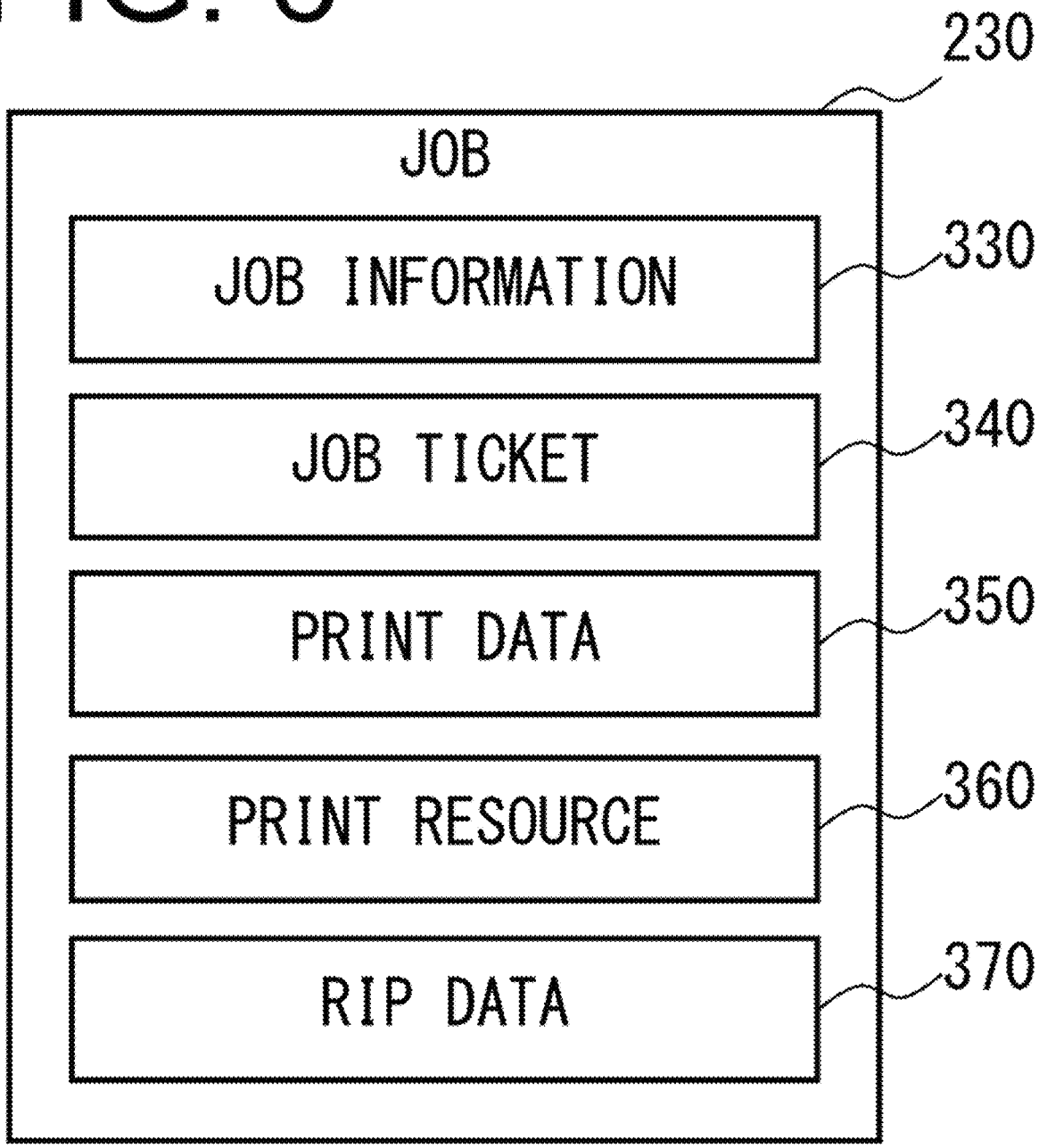
FIG. 6 is a block diagram showing details of the job as shown in FIG. 3.

Next, with reference to FIG. 6, the details of the job 230 is described.

In the present embodiment, data mainly used in the rasterization, printing step, and post-processing step in the job 230 is described.

The job 230 includes job information 330, job ticket 340, print data 350, print resource 360, and the like. The job 230 may also include RIP data 370 depending on the type of job.

The job information 330 is data including attributes specified in printing process (hereinafter referred to as "specified attributes"). In the job information 330, as specified attributes, the type of the job 230, the name of the job 230, the name of the project (order), the designation of the printing apparatus 2 or the post-processing apparatus 3, the number of copies, whether or not collation is performed, whether or not recording is performed, the trimming mm number, print direction, print state, priority, or the like, are set. Among these, the types of the jobs 230 include a job 230 for performing rasterizing process (rasterize job), a job 230 for a printing step (print job), and a job 230 for a post-processing step (post-processing job).

The job ticket 340 is setting data including print instruction attributes for requesting the job 230. The job ticket 340 includes, as print instruction attributes, settings necessary for the printing step and the post-processing step. Specifically, the job ticket 340 includes lower-level settings in the workflow, which are order settings, such as color profile designation, imposition designation, paper designation, bookbinding designation, and the like. In the present embodiment, the job ticket 340 may include reservation information designating the printing apparatus 2 or post-processing apparatus 3. The reservation information may correspond to the groups described above.

The job ticket 340 may also be written in JDF and/or JMF.

The print data 350 is data of a print manuscript in which a design is set according to the order. The print data 350 may be, for example, electronic document data such as PDF (Portable Document Format), or the like, PS (Postscript) data, other vector data, data formatted for manuscript submission, the other raster image data, and the like.

The print resource 360 is information on various resources required for printing instructions such as color profiles, spot colors, fonts, and the like. These various resources correspond to the capability information 200.

Other resource data required for printing are also included in this print resource 360.

The RIP data 370 is data such as PDF containing image data performed rasterizing process based on the job ticket 340. The image data may be, for example, TIFF or other bitmap data. Additionally, the image data may be lossless or lossy compressed.

In addition, job 230 may include processing change information. The processing change information is record information of changes during processing of the job 230. The processing change information may include, for example, information such as correction details when there is a delay in each print server 1 and changes in processing results in printing, and the like. The content of this correction includes, for example, a change in the number of copies or pages, an alternate profile, correction of imposition position, correction of milling designation, correction of cutting width, and the like.

In addition, the storage unit 19 may store schedule information indicating the status of the schedule regarding execution of each job 230. The schedule information may include the status of the job 230, a shipping record, operating status of each component apparatus, and the like. Among these, the shipping record is information related to the physical shipping of printed matter after printing, and it may include information such as printing completion time, shipping time, receipt time, and the like.

Here, the control unit 10 of the print server 1 functions as the group setting unit 100, the job collection unit 110, and the processing management unit by executing the control program stored in the storage unit 19.

Also, each unit of the print server 1 described above serves as a hardware resource for executing the process management method of the present disclosure.

In addition, a part or any combination of the functional configurations described above may be configured in terms of hardware or circuits by using an IC, programmable logic, FPGA (Field-Programmable Gate Array), or the like.

[Job Grouping Execution Process by Print Server 1]

Figure 7:
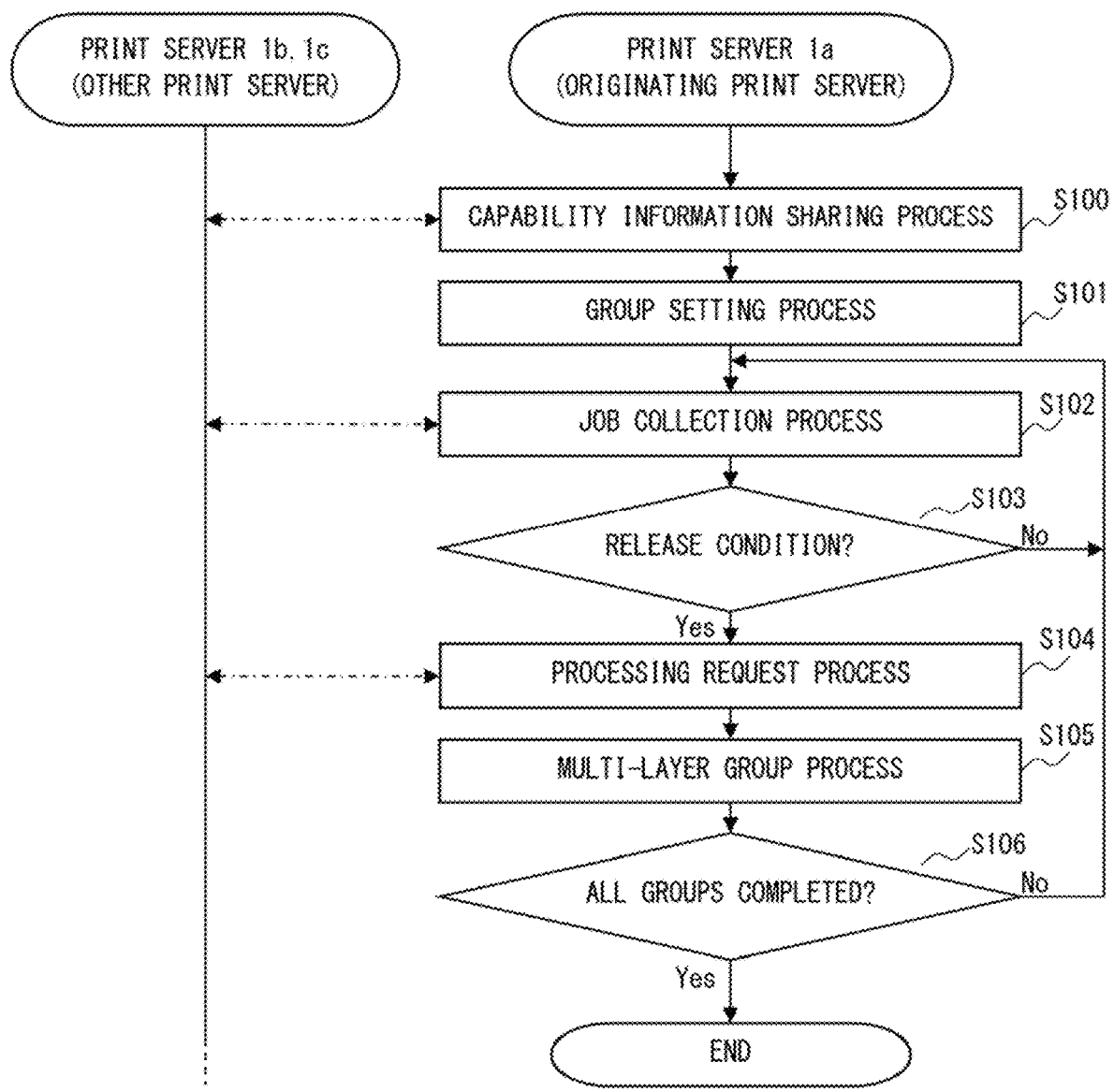
FIG. 7 is a flowchart of job grouping execution process according to the embodiment of the present disclosure.
Figure 8:
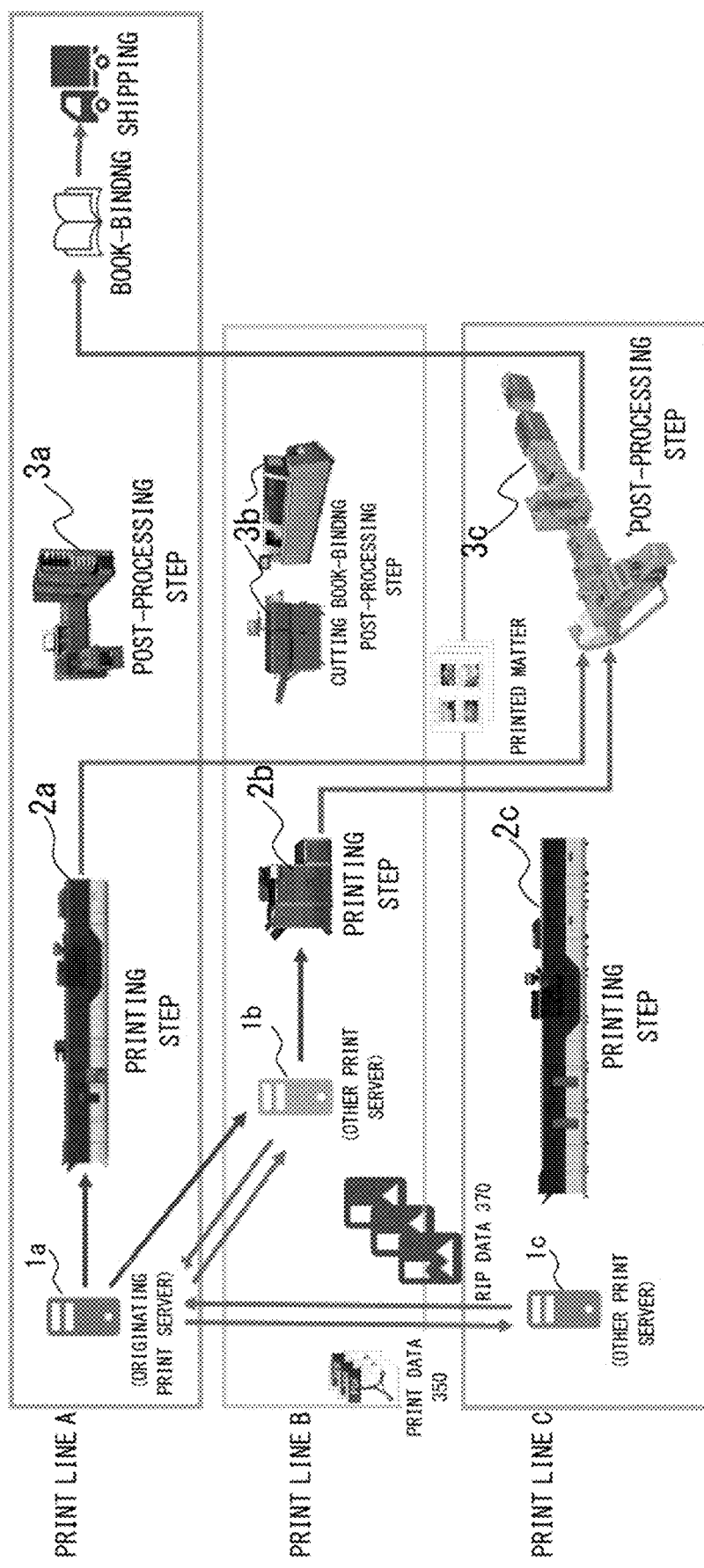
FIG. 8 is a conceptual diagram of processing request and reacquisition of grouped jobs in the job grouping execution process as shown in FIG. 6.

Next, with reference to FIGS. 7 and 8, a job grouping execution process by the print server 1 according to the embodiment of the present disclosure is described.

In the job grouping execution process of the present embodiment, the capability information 200 indicating the capability of rasterizing, printing, and post-processing is stored in the storage unit 19. Then, based on the stored capability information 200, a group is set that designates apparatuses capable of processing the job 230. Then, the jobs 230 corresponding to the set group are determined from the processing requirements of the jobs 230 and collected. Then, the collected jobs 230 are sent to the apparatus specified in the group setting 210 to request processing.

In the job grouping execution process according to the present embodiment, as a representative example, the print server 1*a* of the print line A (site) is set as the originating print server (processing request side), and an example that the control unit 10 of the print server 1*a* mainly executes a program stored in the unit 19 by using hardware resources in cooperation with each unit is described.

The details of the job grouping execution process is described step by step below with reference to the flowchart of FIG. 7.

(Step S100)

Firstly, the group setting unit 100 performs capability information sharing process.

The group setting unit 100 shares the capability information 200 among the print servers 1. In the present embodiment, for example, the group setting unit 100 transmits the capability information 200 to the other print server at each site that is peer-to-peer connected and capable of cooperation. The other print server that has received the shared capability information 200 stores it in the storage unit 19.

(Step S101)

Then, the group setting unit 100 performs group setting process.

The group setting unit 100 can allow a user such as an administrator of the originating print server to set the group setting 210 and the release condition 220. In such case, the group setting unit 100 may allow the user to set the group setting 210 and the release condition 220 by using a template, or the like, by using a GUI (Graphical User Interface) of the dedicated application.

The group setting unit 100, for example, allows the user to set a group that can be processed by the print server 1 as a server group. Also, a group that can be processed by the printing apparatus 2 is set as a printing group. Also, a group that can be processed by the post-processing apparatus 3 is set as a post-processing group.

Further, the group setting unit 100 can allow the user to set a multi-layer group in which the server group, printing group, and post-processing group are layered.

The group setting unit 100 may allow the user to set release condition 220 for each group and each multi-layer group. If the user does not make this setting, a default release condition 220 can be set.

The group setting unit 100 stores the set group setting 210 and the release condition 220 in the storage unit 19.

(Step S102)

Then, the job collection unit 110 performs job collection process.

The job collection unit 110 refers to the group setting 210 and collects the job 230 corresponding to each group based on the processing requirement of the job 230.

Here, firstly, the job collection unit 110 acquires a job 230, which is to be subjected to peer-to-peer distributed processing, from an inter-site management system upstream of the industrial printing system X, an administrator terminal, a prepress apparatus, or the like. The job 230 may be generated by the administrator terminal for a manuscript submitted from the submission terminal.

Then, based on the capability information 200 stored in the storage unit 19, the job collection unit 110 analyzes the job 230 and determines a processing requirement.

Specifically, the job collection unit 110 determines the processing requirement in the printing step and the post-processing step by the job information 330, the job ticket 340, the print data 350, and the print resource 360 included in the job 230.

For example, the job collection unit 110 analyzes the job information 330 and determines the processing requirement based on the type of the job 230, and other information.

Also, the job collection unit 110 analyzes the job ticket 340 such as JDF and/or JMF, or the like, and it determines color profile designation, imposition designation, paper designation, bookbinding designation, or the like, as designated print instruction attributes.

Further, when the print data 350 is PDF or the like, the job collection unit 110 determines attributes designated in the print data 350 by performing a preflight check. This designated attribute may be spot color designation, font designation, or the like.

In addition, job collection unit 110 can also determine the necessary processing requirement from print resources 360.

When confirming these processing requirements, the job collection unit 110 also determines whether the commercial library and plug-in processing are designated.

Then, the job collection unit 110 collects the job 230 whose processing requirement as described above meet the condition of each group of the group settings 210 and associates it in group units.

That is, the job collection unit 110 associates each job 230 of rasterizing process, print processing, and post-processing process with one of the server group, printing group, and post-processing group according to the processing requirement.

Furthermore, the job collection unit 110 can associate each job 230 with a multi-layer group including these groups. That is, in the example of FIG. 5, the jobs 230 collected in each server group are sorted and associated with "PRT-A" and "PRT-B" for each print job 230.

(Step S103)

Then, the processing management unit 120 determines whether or not the release condition 220 is satisfied. If there is a group that satisfies the release condition 220 by the jobs 230 collected by the job collection unit 110, or the like, the processing management unit 120 determines Yes. If there is no group that satisfies the release condition 220, the processing management unit 120 determines No.

In the case of Yes, the group setting unit 100 advances the process to step S104.

In the case of No, the group setting unit 100 returns the process to step S102 and continues collecting the job 230.

(Step S104)

The processing management unit 120 performs processing request processing for the group that satisfies the release condition 220.

At the timing when the release condition 220 is satisfied, the processing management unit 120 transmits the job 230 collected by the job collection unit 110 to the apparatus designated in the group setting 210 to request processing.

Specifically, for each group of the group setting 210, the processing management unit 120 transmits the job 230 to the other print server located at the site where the designated processing-capable apparatus is provided. As a result, the job 230 is executed for rasterizing process, print processing, or post-processing process of the job 230 at each site. The processing management unit 120 may collect the job 230 in unit of group, encrypt it, and request processing to transmit it to the other print server 1 while transmitting and receiving.

In addition, the processing management unit 120 may instruct to transfer the job 230, which has been processed in the other print server, the printing apparatus 2, or the post-processing apparatus 3, between the print servers 1 at each site. The transferring of the job 230 may involve the transmission and reception of the processed print data 350, the RIP data 370, schedule information including shipment records of the printed matter, and the like.

Furthermore, before and after this processing request and processing, the processing management unit 120 may transmit and receive processing status notification and completion notification of the job 230 between the print servers 1. That is, the processing management unit 120 can manage the processing status and the completion of processing between the originating print server and the print server 1 (the other print server) of the apparatus that performs the processing.

In addition, when the release condition 220 is satisfied and the number of jobs 230 associated with the group is "0", that is, in the case there is no job 230 that matches the condition of the group, the processing management unit 120 may not perform the processing request as described above.

(Step S104)

Then, the group setting unit 100 performs multi-layer group process.

The group setting unit 100 can perform regrouping the jobs 230 for which processing has been completed according to the multi-layer group setting of the group settings 210.

For example, the group setting unit 100 regroups the jobs 230 processed in the same group by classifying them into the jobs 230 processed in a higher group.

Furthermore, the group setting unit 100 can change the job 230 itself based on the job 230, which has been completed processing and acquired again from the other print server. For example, group setting unit 100 may change the type of job 230, which has been completed rasterizing process and includes the RIP data 370, from the rasterize job to the print job. Alternatively, the group setting unit 100 may separately include the RIP data 370 in the collected print job.

(Step S106)

Then, the processing management unit 120 determines whether or not the processing of all the groups has been completed.

If the released jobs 230 have been executed for all groups including the multi-layer group, the processing management unit 120 determines Yes. If the jobs 230 of any group is still collecting, the processing management unit 120 determines No.

If Yes, the group setting unit 100 ends the job grouping execution process.

In the case of No, the group setting unit 100 returns the process to step S102 and continues collecting the jobs 230.

With the above, the processing of the job grouping execution process according to the embodiment of the present disclosure completes.

(The Details of Processing by Grouping)

Next, with reference to FIG. 8, an example of grouping according to the present embodiment is described in detail based on the example in which the multi-layer group of FIG. 5 is the online photobook printing as described above.

In this example, in the case where the print line A has the originating print server, the job 230 is delivered as follows:

Firstly, the job collection unit 110 of the print server 1a determines the processing conditions of the received job 230, collects the job 230 that meets the condition of the server groups "PCNT-A", "PCNT-B", and "PCNT-C", and associates it with the server group.

Then, the processing management unit 120 of the print server 1a executes or requests the RIP processing when the release condition 220 of "PCNT-A", "PCNT-B", or "PCNT-C" is satisfied.

At this time, the job 230 collected in the group "PCNT-A" is performed rasterizing process by the print server 1a itself.

On the other hand, as for the job 230 of the group of "PCNT-B" and "PCNT-C", the processing management unit 120 of the print server 1a transmits the job 230 to the print servers 1b and 1c as the other print servers for rasterizing process, respectively.

As a result, the print servers 1b and 1c each performs rasterizing process of the job 230. In addition, at this time, the processing management unit 120 of the print server 1a can also transmit the print data 350 and the job ticket 340 to the print servers 1b and 1c.

Further, after processing, the print servers 1b and 1c can send the job 230 including the RIP data 370, which is performed rasterizing process, and the processing status to the print server 1a, which is the originating print server.

Here, in the case that the release condition 220 is satisfied but the number of jobs 230 associated with the group is "0", that is, in the case that there is no job 230 that satisfies the condition of the group, the processing management unit 120 of the print server 1a need not be executed the process. For example, if there is no job 230 that satisfies the condition of "PCNT-C", only "PCNT-A" and "PCNT-B" are processed.

Furthermore, when an error occurs in the rasterizing process, the other printer server may notify the print server 1a of the error as a process status notification.

Then, when a RIP-completed job 230 including RIP data 370 is acquired as multi-layer group processing, the job collection unit 110 in the print server 1a collects jobs 230 that meet the conditions of "PRT-A" and "PRT-B". At this time, the collected jobs 230 are changed to print jobs including the RIP data 370 by the group setting unit 100. Alternatively, the print jobs themselves for "PRT-A" and "PRT-B" may also be collected, and the RIP data 370 may be added to them.

The group setting unit 100 regroups the changed or collected print jobs of the "PCNT-A" group into "PCNT-A" belonging to "PRT-A" or "PCNT-A" belonging to "PRT-B".

After that, when the release condition 220 are satisfied for the groups "PRT-A" and "PRT-B," printing process is executed or requested as the printing step.

In this case, the processing management unit 120 of the print server 1a causes the job 230 of the group "PRT-A" to perform printing process on the printer 2a.

On the other hand, the processing management unit 120 of the print server 1a performs a processing request the printing apparatus 2b to perform printing process of the job 230 in the group "PRT-B". In addition, even in a multi-layer group, if the number of jobs 230 in the group is "0" even though the release condition 220 is satisfied, that is, if there is no job 230 that matches the condition of the group, the process is not requested and executed.

After completing the execution of the jobs 230 of the "PRT-A" and "PRT-B" groups, the job collection unit 110 of the print server 1a collects the jobs 230, which are print jobs after completion of printing and match the conditions of the "FIN-C" group. At this time, in the case of the multi-layer group, the jobs 230 may be collected in units of included groups that match "FIN-C".

After that, when the release condition 220 of "FIN-C" is satisfied, the processing management unit 120 of the print server 1a requests the process of the post-processing step to be executed by the post-processing apparatus 3c of the print line C.

The print server 1a may be able to acquire the printed output for which the "FIN-C" job has been completed and send it after binding.

By processing in this way, the job 230 can be delivered and even the order can be processed between the originating print server of the print line A and the print server 1b of the print line B and the print server 1c of the print line C, which are the other print servers on the side to which the processing is requested.

In addition, the processing management unit 120 of the originating print server can also adjust the processing request based on the status of the schedule information.

Furthermore, after these processes are completed, the processing management unit 120 may delete the job 230 sent to the other print server.

With the above, the processing by grouping according to the embodiment of the present disclosure completes.

As configured in this way, the following effects can be obtained.

Typical production printing provides a grouping function for collectively processing a plurality of jobs that perform the same processing for the purpose of efficiently processing a large number of print jobs. As a result, it is possible to minimize a set changing such as paper setting changes at the time of printing, or the like, so that printing operations can be made more efficient.

However, in a print line that includes a single print server, a printing apparatus, and a post-processing apparatus, throughput is limited depending on the capabilities of the apparatuses in the print line. For this reason, the groups that can be created are also limited, and the effect of grouping becomes low. For example, when grouping by the printing paper used, jobs containing print instructions that can't be processed by the print server on the same print line can't be included in the group. For this reason, the efficiency of grouping and processing has decreased.

Otherwise, distributed processing, in which print processing is performed by a plurality of printing apparatuses in a distributed manner, requires a management server that transmits and manages the print data to the plurality of printing apparatuses.

Therefore, in production printing, there has been a demand for an industrial printing system capable of achieving peer-to-peer grouping through flexible and efficient distributed processing without using the management server.

On the other hand, the industrial printing system X according to the present embodiment is an industrial printing system for production printing having a plurality of print servers 1 that performs distributed processing of a job, each of the plurality of print servers 1 including: a storage unit 19 that stores capability information 200 indicating capabilities of processability in rasterizing process, printing process, and post-processing process; a group setting unit 100 that sets a group that designates an apparatus capable of processing the job 230 in the group setting 210 based on the capability information 200 stored in the storage unit 19; a job collection unit 110 that collects the job 230 corresponding to the group set by the group setting unit 100 by determining from processing requirement of the job 230; and a processing management unit 120 that transmits the job 230 collected by the job collection unit 110 to the apparatus designated in the group setting 210 and requests processing thereof.

By configuring in this way, in a peer-to-peer type industrial printing system X that enables flexible distributed processing between the print servers 1 without using a management server, grouping can be achieved by efficient distributed processing. Specifically, grouping can be performed flexibly without being limited to one print line. That is, it is possible to generate a larger group that performs processing in cooperation with a plurality of print lines, and to improve the efficiency of the entire print processing.

In the industrial printing system X according to the present embodiment, the group setting unit 100 sets a server group having a print server capable of rasterizing as the apparatus, a printing group having a printing apparatus capable of the printing process as the apparatus, or a post-processing group having the post-processing apparatus capable of the post-processing process as the apparatus as the group.

By configuring in this way, it is possible to group by the server group, printing group, and post-processing group, execute processing for each apparatus, and improve efficiency. Moreover, even if the print server 1, the printing apparatus 2, and the post-processing apparatus 3 at the distribution destinations have different processing capacities, the rasterizing process, the printing process, and the post-processing process can be flexibly distributed and executed.

In the industrial printing system X according to the present embodiment, the group setting unit 100 sets a multi-layer group in which the server group, the printing group, and the post-processing group are layered.

By configuring in this way and setting multi-layer groups, not only one print line but also between the print lines can cooperate to generate a larger group suitable for each process. Therefore, it becomes possible to perform processing efficiently.

In the industrial printing system X according to the present embodiment, the group setting unit 100 sets a release condition 220, which is a condition for a processing request, for each group, and the processing management unit 120 requests the apparatus to process the job 230 according to the release condition 220.

By configuring in this way, the processing request can be made by grouping according to the release condition 220, and the efficiency of the entire printing can be improved.

In the industrial printing system X according to the present embodiment, the release condition 220 includes any one of a threshold for the numbers of job 230, an elapsed time, and a schedule.

By configuring in this way, the release condition 220 can be set flexibly, the operating rate of the entire printing line can be increased, and efficiency can be improved.

Furthermore, the industrial printing system X according to the present embodiment can be configured as a originating print server and other print servers simply by storing the capability information 200 in the existing print server 1 and installing the dedicated application, or the like.

By configuring in this way, the print servers 1 can cooperate with each other in a peer-to-peer manner.

Therefore, it is possible to easily link sites of existing companies, or the like, with each other and improve efficiency by grouping.

In the industrial printing system X according to the present embodiment, the capability information 200 includes information on commercial libraries and plug-in processing in rasterizing process, and the group setting unit 100 is characterized by judging a combination according to information on commercial libraries and plug-in processing.

By configuring in this way, it can be applied even when a commercial library, or the like, is required to process the job 230. That is, commercial libraries are not necessarily provided with every print line. Therefore, even if the job 230 requires it, it can be processed in a printing line with the commercial library, so distributed processing can be performed more efficiently.

Other Embodiments

In the above-described embodiment, an example of changing the type of the reacquired job 230 after completing the processing of the rasterize job and the print job has been described.

However, for example, the job 230 of the printing step may be of the same type, and it may be distinguished between the rasterization job and the print job by the presence or absence of the RIP data 370.

Also, in the above-described embodiment, an example was described in which the other print servers are determined by the originating print server without distinguishing between rasterizing process, printing process, and post-processing process of the job 230.

However, separate print servers 1 (groups) may be used to make decisions in the rasterizing process, the printing process, and the post-processing process.

By configuring in this way, it is possible to deal with a flexible configuration.

Also, in the above-described embodiment, how the jobs 230 are organized in the order unit after being performed grouping and processed is not described.

In this regard, for example, in each group of multi-layer groups in FIG. 5 as described above, each job 230 may be post-processed independently of the order. In this case, after post-processing process, they may be grouped separately according to the same order. More specifically, only bindings may be processed and shipped per order.

Alternatively, the group "FIN-C" at the top of the multi-layer group may be set as a group corresponding to one order, and the plurality of jobs 230 may be grouped accordingly.

That is, for example, one photobook may be grouped as one order.

By configuring in this way, optimal grouping can be achieved according to the order configuration.

In addition, priority may be given to which apparatus should be used for rasterizing process, printing process, and post-processing process. This priority may be set based on the availability of schedule information, the number and performance of component apparatuses, cost, and other information.

By configuring in this way, it is possible to distribute the job 230 to each site and process it more efficiently.

Also, in the above-described embodiment, an example of collecting jobs 230 of the same type as grouping has been described.

However, the group setting 210 may be set conditions related to paper, color printing, finishing, roll paper, or ganging. Among these, in the grouping for roll paper printing, the jobs 230 for one roll are collected for printing by a continuous length printer. In the grouping for ganging printing allows the grouping of jobs 230 that match settings for ganging printing. Here, the ganging printing is a method of printing to collect print materials of different patterns and sizes as one plate.

By configuring in this manner, the grouping for jobs 230 common to paper, color printing, or finishing, the grouping for roll paper, and the grouping for ganging can be used separately, respectively. Therefore, it is possible to efficiently distribute processing in grouping.

Further, in the above-described embodiment, an example has been described in which the capability information 200 of a plurality of print servers 1 is stored in the originating print server or acquired from another print server.

However, a configuration is also possible in which the originating print server determines only the processing requirements of the job 230, transmits these processing requirements to a plurality of print servers 1, and determines whether processing is possible. In this case, each print server 1 may determine whether processing is possible based on the processing requirements of the job 230 and the capability information 200 stored in its own storage unit 19. In the case, the job collection unit 110 of each print server 1 other than the originating print server may directly request the other print server to process the job 230 according to the group setting 210.

With this configuration, it is possible to determine whether the job 230 can be processed without acquiring the capability information 200 of other print servers.

Further, in the above-described embodiment, the example of requesting the other print server 1 to process the job 230 as it is has been described.

However, it is also possible to change the job 230 itself according to the status notification, completion notification, error notification, or the like, for the job 230.

At this time, it is also possible to change the job 230 according to the process change information and the alternative setting. That is, when adjusting the processing request due to the delay, it is possible to change the number of pages, the color profile to be used, or the like, as the job 230 that can be processed, for example, according to the alternative setting.

Alternatively, it is also possible to divide the job 230 itself and transmit the divided job 230 to the originating print server or the print server 1 other than the requested print server.

With this configuration, even if trouble occurs, the job 230 can be executed by distributed processing.

Also, in the above embodiments, an example of distributed peer-to-peer processing has been described.

However, each process of the present embodiment can also be applied to a configuration using a management server.

Also, in terms used in the present embodiment, the singular forms "a," "an," and "the" include plural forms unless the context clearly dictates otherwise.

Further, the configuration and operation of the above-described embodiment are examples, and needless to say, they can be modified and executed as appropriate without departing from the aim of the present disclosure.

What is claimed is:

1. An industrial printing system for production printing having a plurality of print servers that performs distributed processing of a job, each of the plurality of print servers comprising:
    a storage unit that stores capability information indicating capabilities of processability in rasterizing process, printing process, and post-processing process;
    a group setting unit configured to set a plurality of groups that each designate an apparatus capable of processing the job based on the capability information stored in the storage unit;
    a job collection unit configured to collect the job as corresponding to each of the groups set by the group setting unit by determining from processing requirement of the job; and
    a processing management unit configured to transmit the job collected by the job collection unit to the apparatuses designated in the groups and requests processing thereof;
    wherein the plurality of groups comprises:
        a server group having a print server capable of rasterizing as the apparatus of the server group,
        a printing group having a printing apparatus capable of the printing process as the apparatus of the printing group, and
        a post-processing group having a post-processing apparatus capable of the post-processing process as the apparatus of the post-processing group.

2. The industrial printing system according to claim 1, wherein:
    the group setting unit sets a multi-layer group in which a plurality of server groups, a plurality of printing groups, and the post-processing group are layered.

3. The industrial printing system according to claim 1, wherein:
    the group setting unit sets a release condition, which is a condition for a processing request, for each group, and the processing management unit requests an apparatus to process the job according to the release condition.

4. The industrial printing system according to claim 2, wherein the group setting unit regroups jobs that has been completed processing according to settings of the multi-layer group.

5. The industrial printing system according to claim 2, wherein the group setting unit changes type of the job that has been completed processing and acquires again from another print server.

6. The industrial printing system according to claim 3, wherein the release condition is set for the entire multi-layer group, including the groups layered in the multi-layer group.

7. The industrial printing system according to claim 6, wherein:
the release condition includes any one of a threshold for the number of jobs, an elapsed time, and a schedule.

8. A print server that performs distributed processing of a job in an industrial printing system for production printing, comprising:
a storage unit that stores capability information indicating capabilities of processability in rasterizing process, printing process, and post-processing process;
a group setting unit configured to set a plurality of groups that designates an apparatus capable of processing the job based on the capability information stored in the storage unit;
a job collection unit configured to collect the job as corresponding to each of the groups set by the group setting unit by determining from processing requirement of the job; and
a processing management unit configured to transmit the job collected by the job collection unit to the apparatuses designated in the groups and requests processing thereof;
wherein the plurality of groups comprises:
a server group having a print server capable of rasterizing as the apparatus of the server group;
a printing group having a printing apparatus capable of the printing process as the apparatus of the printing group; and
a post-processing group having a post-processing apparatus capable of the post-processing process as the apparatus of the post-processing group.

9. The print server according to claim 8, wherein:
the group setting unit sets a multi-layer group in which a plurality of server groups, a plurality of printing groups, and the post-processing group are layered.

10. The print server according to claim 8, wherein:
the group setting unit sets a release condition, which is a condition for a processing request, for each group, and
the processing management unit requests an apparatus to process the job according to the release condition.

11. The print server according to claim 10, wherein:
the release condition includes any one of a threshold for the number of jobs, an elapsed time, and a schedule.

12. A process management method performed by an industrial printing system for production printing, comprising a plurality of print servers for distributed processing of jobs, comprising the steps of:
storing capability information indicating capability of processability in rasterizing process, printing process, and post-processing process;
setting a plurality of groups that each designate an apparatus capable of processing a job based on the stored capability information;
collecting the job as corresponding to each of the set groups by determining from the processing requirements of the jobs; and
transmitting the collected jobs to the apparatuses designated in the groups to request processing thereof;
wherein
the step of setting a plurality of groups comprises setting:
a server group having a print server capable of rasterizing as the apparatus of the server group,
a printing group having a printing apparatus capable of the printing process as the apparatus of the printing group, and
a post-processing group having a post-processing apparatus capable of the post-processing process as the apparatus of the post-processing group.

13. The process management method of claim 12, wherein the step of setting a plurality of groups comprises:
setting a multi-layer group in which a plurality of server groups, a plurality of printing groups, and the post-processing group are layered.

14. The process management method according to claim 12, further comprising:
setting a release condition, which is a condition for a processing request, for each group, and
requesting an apparatus to process the job according to the release condition.

15. The process management method according to claim 14, wherein:
the release condition includes any one of a threshold for the number of jobs, an elapsed time, and a schedule.

* * * * *